United States Patent
Sugimoto

(10) Patent No.: US 11,622,251 B2
(45) Date of Patent: Apr. 4, 2023

(54) WIRELESS COMMUNICATION SYSTEM AND IN-VEHICLE SYSTEM

(71) Applicant: Yazaki Corporation, Tokyo (JP)

(72) Inventor: Terumitsu Sugimoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 103 days.

(21) Appl. No.: 17/332,262

(22) Filed: May 27, 2021

(65) Prior Publication Data

US 2021/0377711 A1 Dec. 2, 2021

(30) Foreign Application Priority Data

Jun. 2, 2020 (JP) .............................. JP2020-096087

(51) Int. Cl.
*H04W 4/48* (2018.01)
*H04W 76/14* (2018.01)
*H04W 76/11* (2018.01)
*H04B 10/116* (2013.01)

(52) U.S. Cl.
CPC ............ *H04W 4/48* (2018.02); *H04B 10/116* (2013.01); *H04W 76/11* (2018.02); *H04W 76/14* (2018.02)

(58) Field of Classification Search
CPC ....... H04W 4/48; H04W 76/11; H04W 76/14; H04W 12/068; H04W 12/50; H04B 10/116; H04B 10/25752
See application file for complete search history.

(56) References Cited

U.S. PATENT DOCUMENTS

| | | | |
|---|---|---|---|
| 2016/0214530 A1* | 7/2016 | Sugimoto | B60Q 3/80 |
| 2017/0118321 A1* | 4/2017 | Buttolo | H04W 12/08 |
| 2017/0182957 A1* | 6/2017 | Watson | B60N 2/90 |
| 2019/0356741 A1 | 11/2019 | Watson et al. | |
| 2020/0169321 A1 | 5/2020 | Yamamoto et al. | |
| 2020/0359487 A1* | 11/2020 | Tolen | H05B 45/20 |

FOREIGN PATENT DOCUMENTS

| | | |
|---|---|---|
| JP | 2012-060396 A | 3/2012 |
| JP | 2019-78577 A | 5/2019 |

* cited by examiner

*Primary Examiner* — Jae Y Lee

(74) *Attorney, Agent, or Firm* — Sughrue Mion, PLLC

(57) ABSTRACT

A wireless communication system and an in-vehicle system which can establish communication without manually inputting code information such as a pairing ID are provided. In the wireless communication system, when a long-pressing operation of a lamp switch is performed, a pairing ID required for establishing wireless communication with a mobile device is acquired from a wireless unit, and the pairing ID is converted to an optical signal and transmitted from a lamp. The mobile device receives the optical signal by an imaging unit and acquires the pairing ID to establish the wireless communication with the wireless unit.

7 Claims, 3 Drawing Sheets

WIRELESS COMMUNICATION SYSTEM AND IN-VEHICLE SYSTEM

TECHNICAL FIELD

The present invention relates to a wireless communication system in which an in-vehicle communication device mounted on a vehicle communicates wirelessly with a mobile device, and relates to an in-vehicle system.

BACKGROUND

For example, an in-vehicle device such as a navigation device and a car audio mounted on a vehicle such as an automobile, and a mobile device such as a smartphone, are connected via wireless communication such as via Bluetooth.

For example, in Patent Document 1, a setting operation of the navigation device and an operation of the mobile phone are associated with each other so that the navigation device can be operated by the mobile phone. To this end, the navigation device and the mobile phone are connected via Bluetooth.

PRIOR ART DOCUMENT

Patent Document 1: JP 2012-60396 A

SUMMARY OF THE INVENTION

Problem to be Solved by the Invention

When communicating via Bluetooth as in Patent Document 1, a pairing ID (also called a passkey, PIN code, etc.) is inputted at the time of pairing to prevent connection with an unintended device. This pairing ID is displayed on, for example, a screen of one of the devices to be paired, and the displayed pairing ID is manually inputted to another one of the devices.

In such a device, in the case where the pairing ID is displayed on a monitor screen and such installed on an instrument panel and such in the vehicle, it is difficult for a passenger seated in a rear seat to see and input the pairing ID. Also, even for a passenger seated in a front seat, it is troublesome to manually input the pairing ID.

In view of this, an object of the present invention is to provide a wireless communication system and an in-vehicle system which can establish communication without manually inputting code information such as a pairing ID.

Solution to the Problem

In order to achieve the above-described object, the present invention provides, in one aspect, a wireless communication system including: an in-vehicle communication device mounted on a vehicle and configured to perform wireless communication; an illuminating device including an illuminating unit configured to illuminate a predetermined area in a vehicle interior of the vehicle, and an operation switch configured to switch on or off the illuminating unit; and a mobile device that includes a light receiving unit capable of receiving light of the illuminating unit and that is configured to perform the wireless communication with the in-vehicle communication device, wherein the illuminating device is configured to: when a specific operation is performed on the operation switch, acquire, from the in-vehicle communication device, code information required for establishing the wireless communication with the mobile device; and convert the code information to an optical signal to cause the illuminating unit to blink to thereby transmit the optical signal, and wherein the mobile device is configured such that the light receiving unit recognizes the blinking of the illuminating unit and thereby receives the optical signal to acquire the code information to establish the wireless communication with the in-vehicle communication device.

Advantageous Effect Of The Invention

According to the present invention as described above, since the code information is transmitted as an optical signal from the illuminating device to the mobile device, wireless communication can be established without manually inputting the code information.

DETAILED DESCRIPTION OF THE EXEMPLARY EMBODIMENTS

Figure 1:
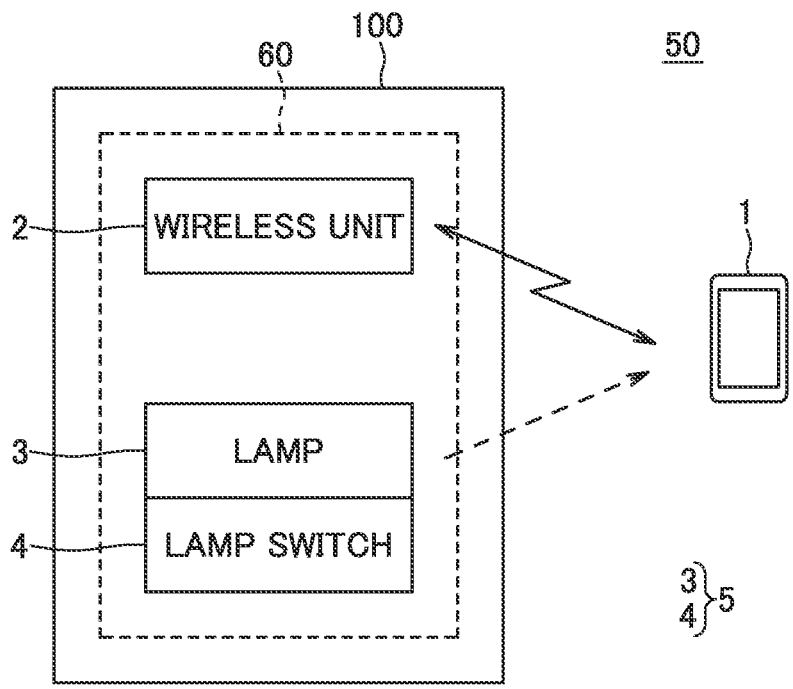
FIG. 1 is a schematic configuration diagram of a wireless communication system and an in-vehicle system according to one embodiment of the present invention.

One embodiment of the present invention will be described with reference to the drawings. FIG. 1 is a schematic configuration diagram of a wireless communication system according to one embodiment of the present invention. A wireless communication system 50 includes a mobile device 1, a wireless unit 2, a lamp 3 and a lamp switch 4. The wireless unit 2, the lamp 3 and the lamp switch 4 are installed in a vehicle 100 such as an automobile. Further, the wireless unit 2, the lamp 3 and the lamp switch 4 constitute an in-vehicle system 60 according to one embodiment of the present invention.

Figure 2:
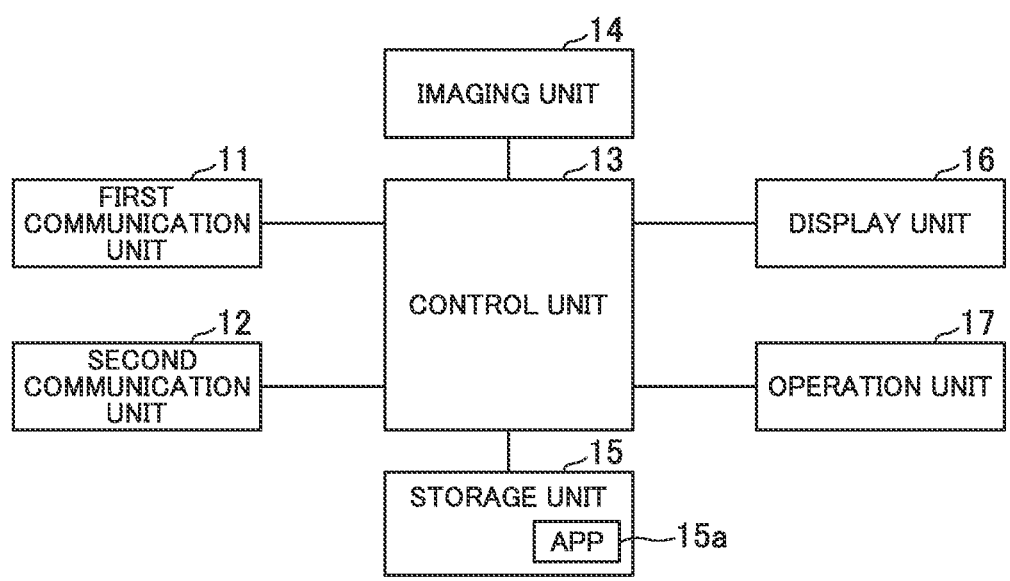
FIG. 2 is a functional configuration of a mobile device shown in FIG. 1.

The mobile device 1 is a device that a user can carry and bring into the vehicle 100, and examples thereof include a smartphone, a mobile phone, a mobile music player and the like. A functional configuration diagram of the mobile device 1 is shown in FIG. 2. FIG. 2 shows an example of a smartphone as the mobile device 1.

The mobile device 1 includes a first communication unit 11, a second communication unit 12, a control unit 13, an imaging unit 14, a storage unit 15, a display unit 16, and an operation unit 17.

The first communication unit 11 includes a circuit, an antenna, etc. for communicating with a public line such as a mobile phone network. The second communication unit 12 includes a circuit, an antenna, etc. for direct wireless communication with the wireless unit 2 via Bluetooth.

The control unit 13 is constituted of a microcomputer having, for example, a central processing unit (CPU) that performs various processes and controls and such according to a predetermined program, ROM which is read-only memory that stores, for example, a program for processes performed by the CPU, and RAM which is read write memory that stores various data and which is provided with a region necessary for the processing by the CPU. The control unit 13 manages overall control of the mobile device 1.

The imaging unit 14 as a light receiving unit is configured as a camera module including an imaging element such as a CCD image sensor or a CMOS image sensor or the like and an optical component such as a lens. That is, the imaging unit 14 has an element capable of receiving and recognizing blinking of illumination light from the lamp 3.

The storage unit 15 is constituted of, for example, a non-volatile memory or the like, and stores data such as an OS and/or an application program (hereinafter, "app") operated by the control unit 13. Further, the storage unit 15 stores an app 15*a* which is an analysis program for analyzing an optical pulse signal described later.

The display unit 16 is constituted of, for example, a liquid crystal display, an organic EL display, or the like, and displays an operation screen of an OS, an app, etc. The operation unit 17 is constituted of, for example, a touch panel and such, and receives an operation by the user.

The wireless unit 2 as the in-vehicle communication device communicates with the mobile device 1 via Bluetooth. Further, it transmits information received from the mobile device 1 and such to the in-vehicle device via an in-vehicle LAN described later. The wireless unit 2 includes a circuit, an antenna, etc. for communicating via Bluetooth. The wireless unit 2 does not have to be a standalone device, and it may be included in a navigation device or a car audio, or a meter device for displaying speed, or the like, installed in the vehicle 100.

The lamp 3 as an illuminating unit is provided in a vehicle interior of the vehicle 100, and is configured to emit light by operating the lamp switch 4 to illuminate a predetermined area in the vehicle interior. As a light source of the lamp 3, it is preferable to use an element such as a light emitting diode capable of modulating the pairing ID into an optical pulse signal of about several kHz to several MHz, as will be described later. The lamp 3 can be constituted of a lamp and such installed in the vehicle interior or to a door, etc., such as, for example, a personal lamp, a dome lamp, a room lamp, a map lamp, etc.

The lamp switch 4 as an operation switch is constituted of, for example, a pushbutton and such, and is a switch for switching on (light up) and off (turn off) the lamp 3. The lamp switch 4 is provided in the vicinity of the lamp 3, for example. Further, the lamp switch 4 of this embodiment only switches on or off the lamp 3 when it is short-pressed, but can cause the wireless unit 2 to perform a pairing operation described later when it is long-pressed. In this embodiment, the long-pressing is described as a specific operation; however, the specific operation may be another operation such as a double click (two continuous short-pressing) as long as it is different operation from the short-press.

Figure 3:
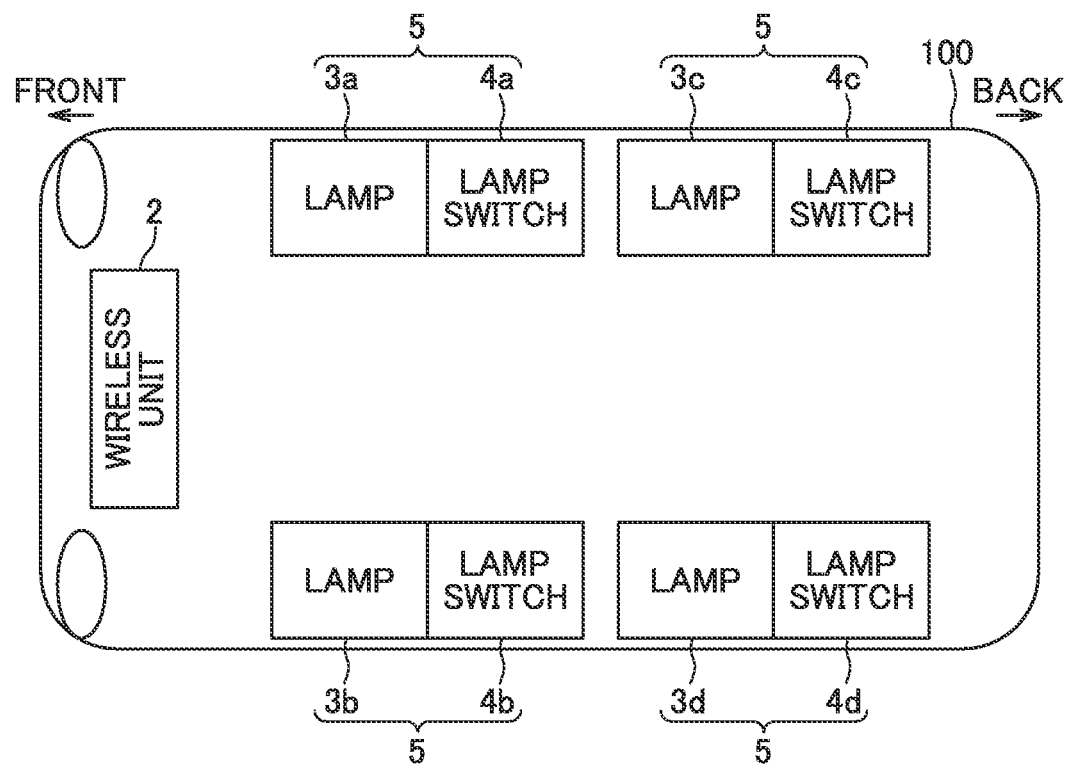
FIG. 3 illustrates an exemplary arrangement in a vehicle interior of lamps and lamp switches shown in FIG. 1.

As described above, the lamp 3 and the lamp switch 4 constitute an illuminating device 5 (refer to FIG. 1 and FIG. 3).

An exemplary arrangement of the lamp 3 and the lamp switch 4 in the vehicle interior will be described with reference to FIG. 3. FIG. 3 is a schematic diagram of an exemplary arrangement of the lamp 3 and the lamp switch 4 in the vehicle interior of the vehicle 100. In FIG. 3, the wireless unit 2 is installed on the front side of the vehicle interior.

In the example of FIG. 3, there are provided lamps 3*a*, 3*b*, 3*c*, 3*d* and lamp switches 4*a*, 4*b*, 4*c*, 4*d*. These lamps 3*a*, 3*b*, 3*c*, 3*d* and the lamp switches 4*a*, 4*b*, 4*c*, 4*d* are provided on a roof and/or pillars in the vehicle interior, and the lamps 3*a*, 3*b*, 3*c*, 3*d* are capable of being turned on and off individually from each seat. That is, the lamps 3 are provided at a plurality of locations in the vehicle interior, and the lamp switches 4*a*, 4*b*, 4*c*, 4*d* are provided at a plurality of locations corresponding to the plurality of lamps 3*a*, 3*b*, 3*c*, 3*d*.

Further, the lamp switch 4*a* can perform operation of turning on and off the lamp 3*a*. The lamp switch 4*b* can perform operation of turning on and off the lamp 3*b*. The lamp switch 4*c* can perform operation of turning on and off the lamp 3*c*. The lamp switch 4*d* can perform operation of turning on and off the lamp 3*d*. That is, the lamps 3*a*, 3*b*, 3*c*, 3*d* and the lamp switches 4*a*, 4*b*, 4*c*, 4*d* are paired, respectively. Further, the long-pressing operation described above is possible for all of the lamp switches 4*a*, 4*b*, 4*c*, 4*d*.

Figure 4:
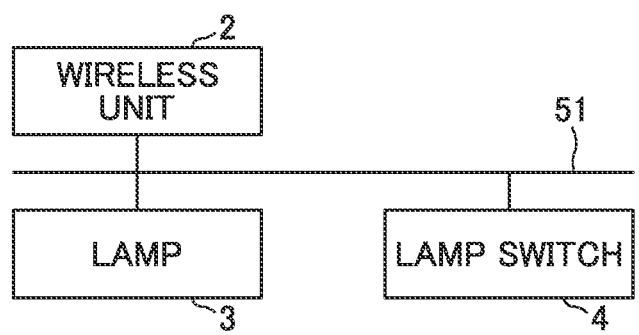
FIG. 4 illustrates an in-vehicle LAN.

Further, as shown in FIG. 4, the wireless unit 2, the lamp 3 and the lamp switch 4 installed in the vehicle 100 are connected to each other by an in-vehicle LAN 51 such as a CAN. Further, another in-vehicle device may be connected to the in-vehicle LAN 51. Thus, a signal (control signal, etc.) according to an operation received by the lamp switch can be transmitted to the lamp 3 and the wireless unit 2. Further, the pairing ID can be transmitted from the wireless unit 2 to the lamp 3 as described later.

Figure 5:
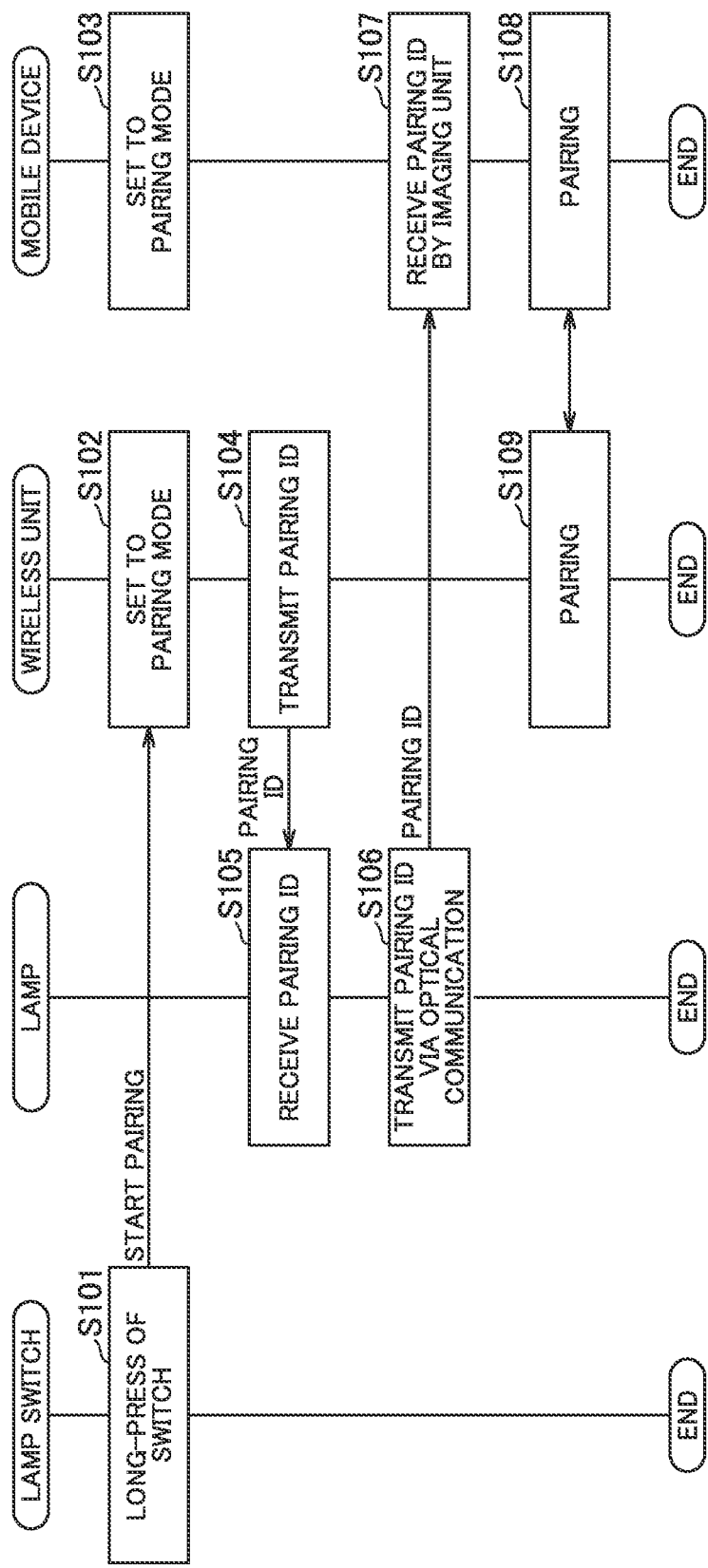
FIG. 5 is a sequence diagram of a pairing operation in the wireless communication system shown in FIG. 1.

Next, a pairing operation for pairing the mobile device 1 and the wireless unit 2 in the wireless communication system 50 having the above-described configuration will be described with reference to a sequence diagram of FIG. 5. The sequence diagram of FIG. 5 illustrates an operation for pairing the mobile device 1 owned by a passenger of the vehicle 100 and the wireless unit 2.

First, a passenger long-presses the lamp switch 4 (step S101). Then, a signal (information) providing an instruction to start pairing is transmitted from the lamp switch 4 to the wireless unit 2 via the in-vehicle LAN 51. Once the wireless unit 2 receives the signal providing an instruction to start pairing from the lamp switch 4, the wireless unit 2 is set to a pairing mode (step S102).

Meanwhile, with respect to the mobile device 1, the passenger performs a predetermined operation to set it to the pairing mode (step S103). For example, the pairing mode is set by starting the app 15*a*.

When the wireless unit 2 is set to the pairing mode, the pairing ID as code information required for establishing the wireless communication with the mobile device 1 is transmitted to the lamp 3 via the in-vehicle LAN 51 (step S104). The lamp 3 receives the pairing ID (step S105), converts the pairing ID into an optical pulse signal, and causes the light source to blink in accordance with the optical pulse signal (step S106). The lamp 3 may be in a lighted state (turned-on state) in response to the long-pressing of step S101. In that case, the optical pulse signal is superimposed on the illumination light.

With respect to the mobile device 1, when it is set to the pairing mode, the imaging unit 14 is activated by the app 15*a* and is in a state ready to perform imaging. Thus, when the passenger directs the imaging unit 14 of the mobile device 1 toward the lamp 3, the imaging unit 14 can recognize the blinking of the light that constitutes the optical pulse signal and can receive the light (receive the signal) (step S107). The imaging unit 14, however, does not necessarily be directed toward the lamp 3 if the light from the lamp 3 can enter the imaging unit 14.

In the mobile device 1, the optical pulse signal received by the imaging unit 14 is analyzed by the app 15*a* to acquire the pairing ID. Then, using the acquired pairing ID, the mobile device 1 is paired with the wireless unit 2 (steps S108 and S109). Since the Bluetooth pairing operation is a known technique, detailed description thereof is omitted. In this way, the wireless communication between the mobile device 1 and the wireless unit 2 is established.

According to this embodiment, in the wireless communication system 50, when the lamp switch 4 is long-pressed, the pairing ID required for establishing the wireless communication with the mobile device 1 is acquired from the wireless unit 2, and then, the pairing ID is converted into an optical pulse signal and is transmitted from the lamp 3. Then, the mobile device 1 receives the optical pulse signal by the imaging unit 14 and acquires the pairing ID to establish the wireless communication with the wireless unit 2.

With the wireless communication system 50 configured as described above, since the pairing ID is transmitted from the lamp 3 to the mobile device 1 as the optical pulse signal, the wireless communication can be established without manually inputting the pairing ID.

Further, since the pairing ID is transmitted by long-pressing the lamp switch 4, the operation for pairing is facilitated. Moreover, since the pairing operation is facilitated as just described, it is possible to easily perform pairing with an in-vehicle device in vehicles other than a user's own vehicle, such as a rented car or the like.

Further, since the pairing ID is transmitted as an optical signal, it is possible to perform stable pairing without causing mixed communications with other vehicles.

Further, since the imaging unit 14 is a camera, it is possible to receive the pairing ID by using the camera function possessed by many mobile devices. It is thus also easy to add functions. In addition, since the number of additional parts and such can be kept to the minimum for the entire system, the system can be constructed at low cost.

Further, since the lamps 3 are provided at a plurality of locations in the vehicle interior, and the lamp switches 4 are provided corresponding to the plurality of lamps 3 in the vehicle interior, respectively, the pairing operation can be performed regardless of the seating position of the passenger.

In the embodiment described above, Bluetooth has been described as a wireless communication standard; however, other communication standards may be used as long as they are communication standards for inputting code information necessary for establishing wireless communication between devices.

It should be understood that the above-described embodiment is only a representative form of the present invention, and the present invention is not limited to this embodiment. That is, various modifications can be made without departing from the gist of the present invention. Such modifications, as long as they include the configuration of the wireless communication system and the in-vehicle system of the present invention, are of course within the scope of the present invention.

LIST OF REFERENCE SIGNS

1 mobile device
2 wireless unit (in-vehicle communication device)
3 lamp (illuminating unit)
4 lamp switch (operation switch)
5 illuminating device
50 wireless communication system
60 in-vehicle system

What is claimed is:

1. A wireless communication system comprising:
   an in-vehicle communication device mounted on a vehicle and configured to perform wireless communication;
   an illuminating device including
      a lamp as an illuminating unit configured to illuminate a predetermined area in a vehicle interior of the vehicle, and
      a lamp switch as an operation switch configured to switch on or off the illuminating unit; and
   a mobile device that includes a light receiving unit capable of receiving light of the illuminating unit and that is configured to perform the wireless communication with the in-vehicle communication device,
   wherein the illuminating device is configured to:
      when a specific operation is performed on the operation switch, acquire, from the in-vehicle communication device, code information required for establishing the wireless communication with the mobile device; and
      convert the code information to an optical signal to cause the illuminating unit to blink to thereby transmit the optical signal, and
   wherein the mobile device is configured such that the light receiving unit recognizes the blinking of the illuminating unit and thereby receives the optical signal to acquire the code information to establish the wireless communication with the in-vehicle communication device.

2. The wireless communication system according to claim 1, wherein
   the mobile device includes an analysis program for analyzing the optical signal, and
   the code information is acquired by the analysis program.

3. The wireless communication system according to claim 1, wherein
   a plurality of illuminating units is provided at a plurality of locations in the vehicle interior, and
   a plurality of operation switches is provided at a plurality of locations corresponding to the plurality of illuminating units.

4. The wireless communication system according to claim 1, wherein the lamp is separate from any electronic monitor of the vehicle.

5. The wireless communication system according to claim 1, wherein
   the illuminating device is configured to any of turn on and turn off the lamp in response to a short press to the lamp switch, and
   the specific operation comprises a long press to the lamp switch.

6. The wireless communication system according to claim 5, wherein
   the illuminating device is configured to, in response to determining that the long press to the lamp switch occurred and in a case in which the lamp is already turned on and emitting an illumination light, control the lamp to superimpose the optical signal on the illumination light.

7. An in-vehicle system comprising:
   an in-vehicle communication device mounted on a vehicle and configured to perform wireless communication with a mobile device; and
   an illuminating device including
      a lamp as an illuminating unit configured to illuminate a predetermined area in a vehicle interior of the vehicle, and a lamp switch as an operation switch configured to switch on or off the illuminating unit, wherein the illuminating device is configured to:
when a specific operation is performed on the operation switch, acquire, from the in-vehicle communication device, code information required for establishing the wireless communication with the mobile device;
convert the code information to an optical signal to cause the illuminating unit to blink to thereby transmit the optical signal to the mobile device.

* * * * *